W. D. WILCOX.
APPARATUS FOR THE MANUFACTURE OF COMBINED COAL AND WATER GAS.
APPLICATION FILED JAN. 17, 1916.

1,321,963.

Patented Nov. 18, 1919.
4 SHEETS—SHEET 1

Fig. 1

UNITED STATES PATENT OFFICE.

WILLIAM D. WILCOX, OF CHICAGO, ILLINOIS.

APPARATUS FOR THE MANUFACTURE OF COMBINED COAL AND WATER GAS.

1,321,963.  Specification of Letters Patent.  Patented Nov. 18, 1919.

Application filed January 17, 1916. Serial No. 72,467.

*To all whom it may concern:*

Be it known that I, WILLIAM D. WILCOX, a citizen of the United States, and a resident of Chicago, in the county of Cook and State of Illinois, have invented certain new and useful Improvements in Apparatus for the Manufacture of Combined Coal and Water Gas, of which the following is a specification, reference being had to the accompanying drawings.

My invention relates to the manufacture of gas suitable for illuminating and fuel purposes, and has to do more particularly with gas manufacturing apparatus of the general type shown and described in my pending applications, Serial Nos. 26,286, filed May 6, 1915, and 40,612, filed July 23, 1915, in which the materials from which the gas is derived are treated in what may be termed "retort generators"—*i. e.*, a generator extended upwardly to form a retort through which the materials treated pass downward by gravity to the generator portion of the apparatus, being meanwhile subjected to varying degrees of heat applied both externally and internally of the retort portion of the apparatus.

As explained in my said applications, a plurality of such retort generators are grouped and connected so that they may be operated cyclically, thereby maintaining a continuous production of water gas derived from the several retort-generators operating in sequence. For example, where two of such retort-generators are employed, one of them will be generating water gas during the blast period of the other, and when the latter reaches the proper temperature for the generation of water gas, it is used for that purpose and the former retort-generator is put on blast. The product of both generators may be conducted to the same holder, and in large part the conduits for supplying steam and air, and for conducting and utilizing the gases released incidentally to the operation of the apparatus, are used in common in connection with the operation of both retort-generators.

My improved apparatus is designed for the manufacture of gas either from sub-bituminous coal, lignite, or peat, or from gas coal. It has for its object to provide an improved apparatus by the use of which it will be practicable to economically manufacture gas of good commercial quality from any of the materials mentioned. I acccomplish this object as illustrated in the drawings and as hereinafter described. What I regard as new is set forth in the claims.

Sub-bituminous coal, lignite and peat all contain large percentages of moisture and combined oxygen, and are not adapted to use in existing apparatus for the production of a gas for general distribution because of the cost of the removal of the moisture and carbon dioxid. By my improved apparatus I avoid this objection and make practicable the use of the materials named for the commercial manufacture of gas, by removing the excess of moisture and carbon dioxid from the materials treated before the tar and combustible gases begin to come off in quantity, using the steam in the manufacture of water gas. The carbon dioxid is also introduced into the generator after having been superheated, where it is broken up and converted into carbon monoxid. As will more clearly hereafter appear, I thus not only avoid the expense which is usually necessary in the treatment of gas for the removal of the excess moisture and carbon dioxid contained in it, but, also effect the separation of such substances from the gas as an incident to the gas manufacturing process, and utilize the steam and carbon dioxid in conducting later steps of the operation; consequently the combustible gas produced is not only of much higher quality, but it is produced more economically.

When the material used for gas production is a gas coal—*i. e.* a coal rich in volatiles and containing only small percentages of moisture and combined oxygen—my improved apparatus provides for a more effective decomposition of the heavy hydrocarbons, which tend to condense, and the low temperature tar, and also effects the conversion of the carbon dioxid into carbon monoxid, and decomposes a portion of the water vapor into its constituent elements. The decomposition of the condensable hydrocarbons, resulting in the formation of fixed gases, increases the quantity and, in some degree, the quality of the gas made. In addition to these advantages, my improved apparatus also utilizes completely the heat produced by partial combustion of the residue of distillation, as it supports the water gas reaction in the generator; it supplies the heat required for the carbonization of the coal; it superheats the steam used in water gas production; and finally, on its way to the chimney or stack, it imparts a large portion of its remaining heat to the air supply.

In the accompanying drawings, in which I have illustrated my invention embodied in an apparatus by the use of which the desirable results already enumerated, as well as others hereinafter set forth, may be realized—

Figure 1:
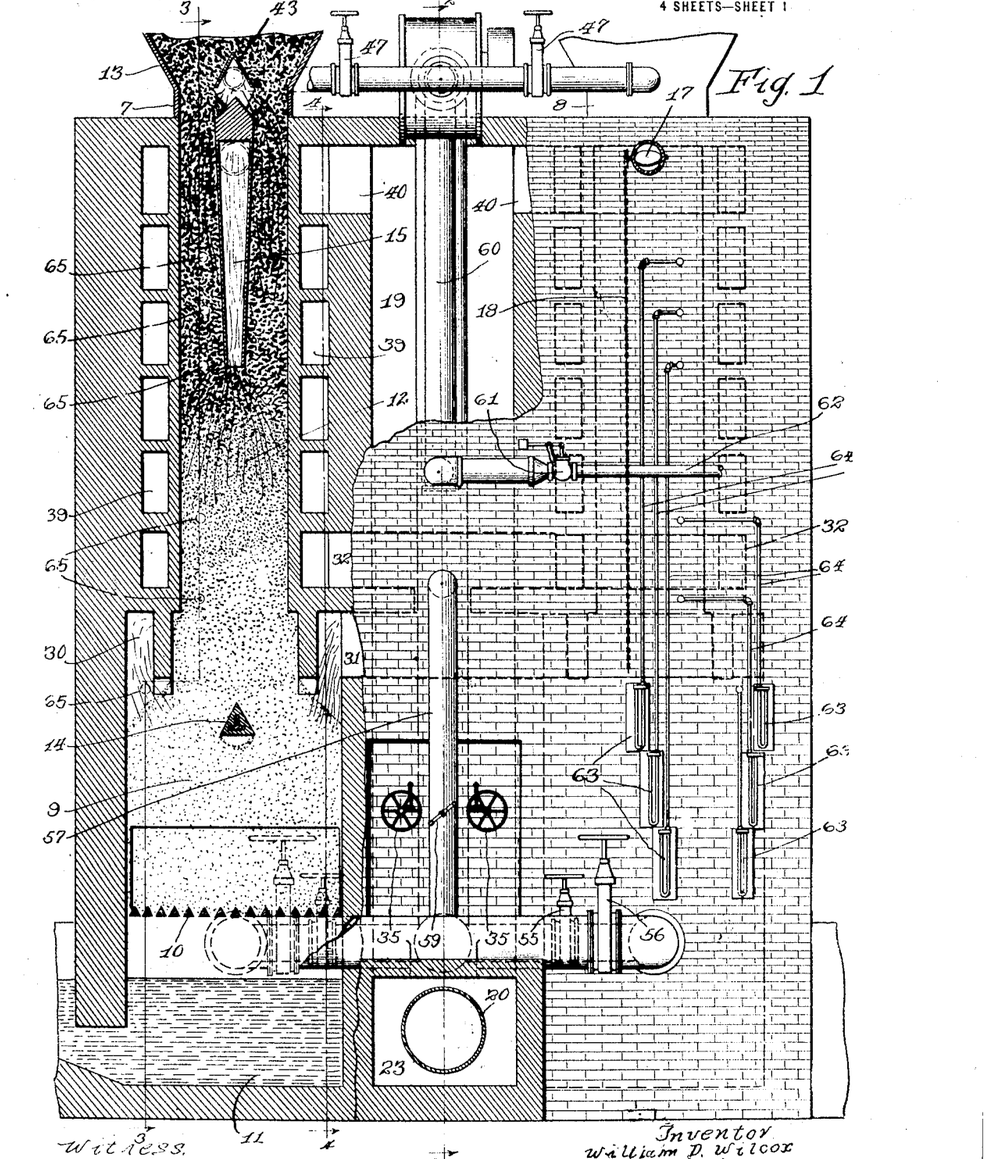
Figure 1 is a front elevation, partly in section, showing an apparatus comprising two associated retort generator units arranged to be operated cyclically,—the illustration of Fig. 1 being in part a section on line 1—1 of Fig. 2.

In the embodiment of my invention illustrated, 7—8 indicate two retort generators, which are in all essential respects alike, and therefore a description of one will suffice for both. Each of such retort generators comprises a water gas generator, or generating chamber, 9 having a grate 10, below which is the usual water-sealed pit 11. Above the generator, and constituting an extension upward thereof, is a retort 12 which terminates at its upper end in a gas-tight hopper 13. The closure of the hopper is not shown, as any suitable form of device for the purpose may be employed. The arrangement is such that the materials treated, being placed in the hopper, pass downward by gravity through the retort toward the generator, in which the residue of the distillation effected in the retort is finally deposited. In order to break up any masses of material formed in the retort and cause it to be properly distributed throughout the generator, I provide a deflector 14, triangular in cross-section, which extends transversely of the generator centrally under the lower end of the retort portion of the apparatus, one of its edges being uppermost, as shown in Fig. 1. This deflector is made of suitable refractory material, preferably inclosing a metallic beam. It serves not only to break up the down-coming material and distribute it throughout the generator, but it also helps to sustain the column of material in the retort, and prevents it from passing too rapidly into the generator. The weight of the column of material coacting with the comparatively sharp ridge of the deflector, insures the breaking up of any large masses which might otherwise interfere with the efficiency of the generator.

Figure 3:
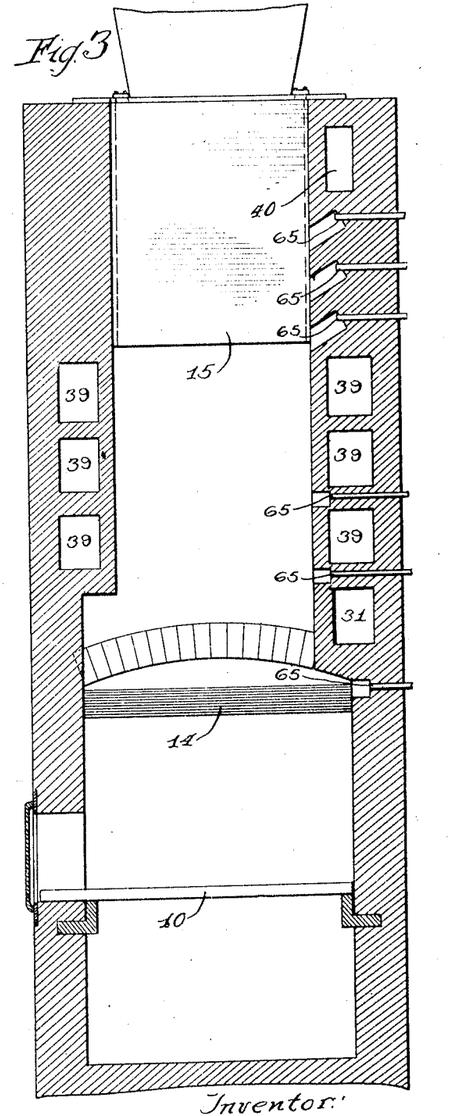
Fig. 3 is a vertical section on line 3—3 of Fig. 1.
Figure 6:
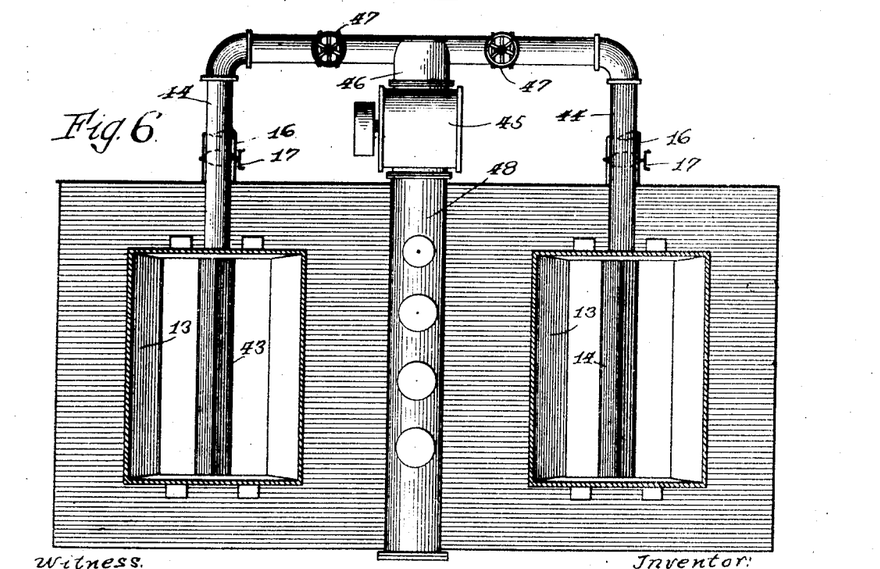
Fig. 6 is a plan view, the coal hoppers being shown in section on line 6—6 of Fig. 2.

In the upper portion of the retort and extending from front to rear centrally thereof, as shown in Figs. 1 and 3, is a duct or flue 15, open at its lower end and tapering inwardly from top to bottom, forming spaces between its side portions and the walls of the retort which flare downwardly. A conduit 16 leads from the upper portion of this flue, through which the gases rising in said flue are conducted away to a holder, or for further treatment. The conduit 16 is provided with a valve 17, as shown in Figs. 1 and 6, said valve being adjustable by means of a chain or equivalent device 18 which is conveniently accessible to the operator. An exhaust fan 16ª is connected to the conduit 16 for withdrawing the gases rising in the flue 15, and regulating the flow of the gases in the retort, as hereinafter described.

Figure 2:
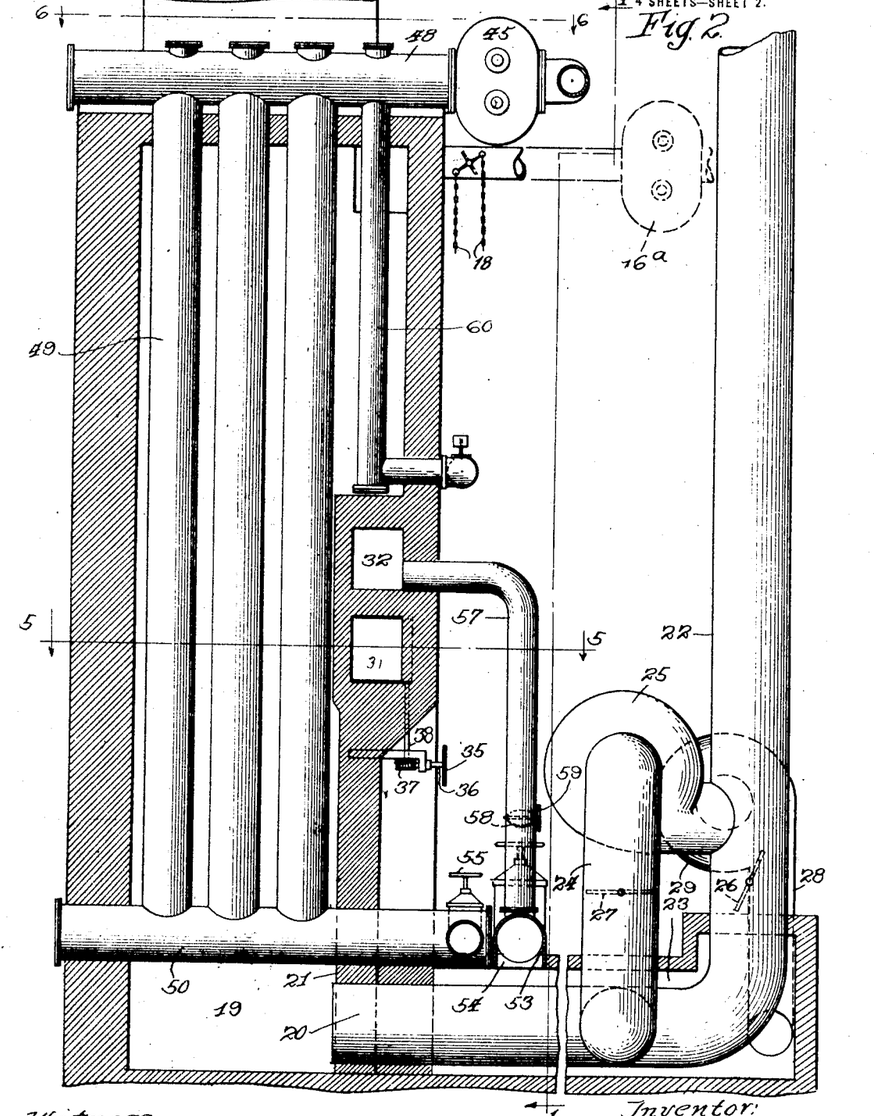
Fig. 2 is a vertical section on line 2—2 of Fig. 1, the stack and some of the pipes or conduits being shown in elevation.

19 indicates a flue disposed intermediately of the two retort generators, said flue being closed at its upper end, as shown in Figs. 1 and 2. At its lower end the flue 19 connects with a pipe or conduit 20, which extends through a partition wall 21, as shown in Fig. 2, and leads to a stack 22. As shown in the latter figure, the pipe 20 passes through an air duct 23, and not only communicates directly with the lower end of the stack, but also is connected therewith by means of a by-pass 24 leading to an exhaust-fan 25 which discharges into the stack 22. A valve 26 is provided in the stack below the connection therewith of the outlet of the fan 25, and a valve 27 is provided in the by-pass 24 between the fan and the pipe 20. By this arrangement the waste gases, which, as will hereinafter appear, are discharged into the upper end of the flue 19 and pass downward therein, may be discharged by natural draft through the pipe 20 directly to the stack, or by operating the exhaust fan 25, they may be positively discharged into the stack through the by-pass 24. In the latter case the valve 27 is opened and the valve 26 closed, said valves being oppositely arranged when natural draft is relied on. By placing the pipe 20 in the air duct 23, the hot gases passing through said pipe give off a considerable part of their heat to the air in said duct, consequently conserving heat that would otherwise be wasted.

28 indicates an air pipe connecting with the air duct 23 and leading from a blower 29, by which air is forced into the duct 23 through said pipe.

Figure 5:
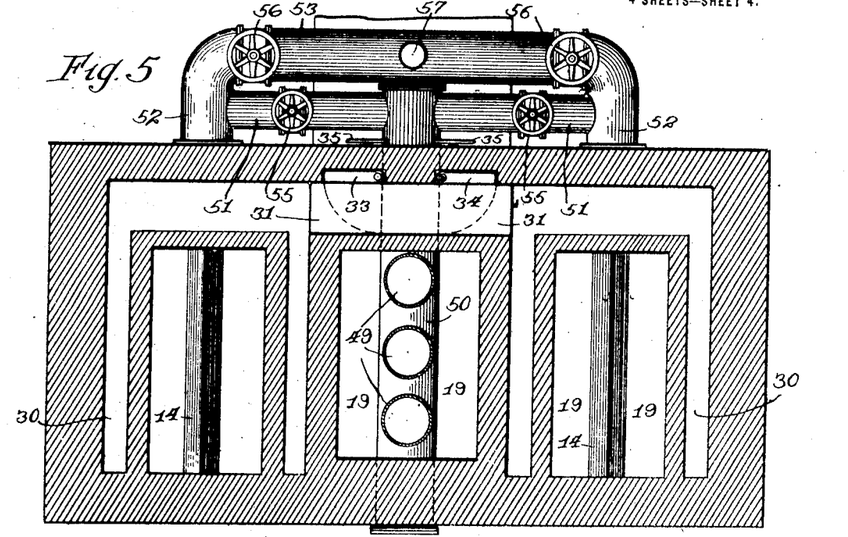
Fig. 5 is a horizontal section on line 5—5 of Fig. 2.

30 indicates a passage, open at the bottom, which extends around three sides of the upper portion of each generator chamber, as shown in Fig. 5, and communicates by a flue 31 with a central combustion chamber 32, best shown in Figs. 2 and 3,—the arrangement being such that waste gases, and any unconsumed gases, passing out of the generator through the passages 30 and 31 are delivered to the combustion chamber 32, where, as hereinafter described, they receive an auxiliary supply of air which induces combustion of any unconsumed combustible gases. Either of the generators may be cut off from the combustion chamber 32 by means of gates 33—34 placed in the passages 31, as shown in Fig. 5, and so arranged that they may turn either into a position parallel with such passages when the passages are to remain open, or to a transverse position with relation to such passages when one or the other of the passages is to be closed, as indicated by dotted lines in Fig. 5. Any suitable mechanism may be employed for operating the gates 33—34; but I prefer to provide each of the gates with a hand-wheel 35 mounted on a shaft 36 which carries a worm meshing with a worm-wheel 37 on the lower end of a shaft 38 which is connected with, or may constitute the pivot of, the gate with which it is connected, as shown in Fig. 2. Thus by rotating either of the hand-wheels 35, the gate connected with it may be swung appropriately to open or close the passage 31 which it controls.

Figure 4:
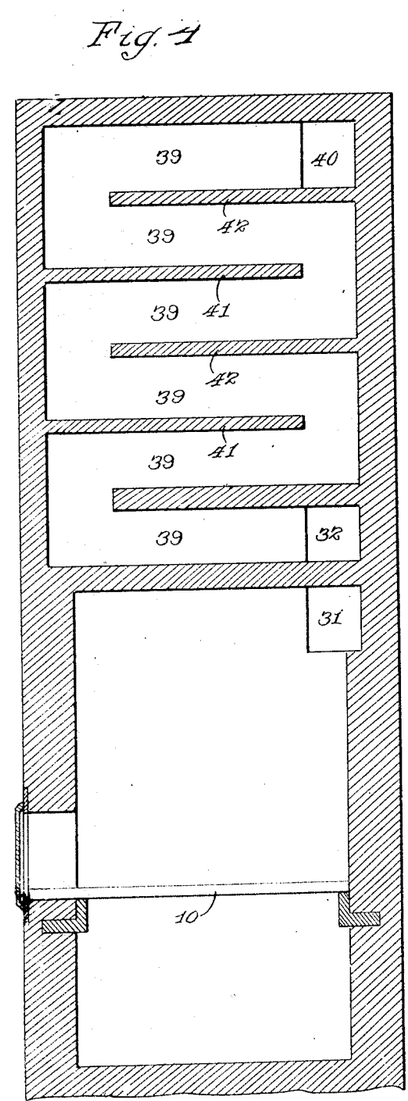
Fig. 4 is a vertical section on line 4—4 of Fig. 1.

The central chamber 32, which as indicated in dotted lines in Fig. 1 connects by a central vertical passage with the passages 31, leads to a series of communicating passages 39 provided at different levels around the retorts, forming flues through which the waste gases are conducted up around the retorts to openings 40 which discharge the gases into the upper end of the flue 19. The circuitous flow of the gases around the retorts is preferably effected by providing the several passages with staggered partitions 41—42 at suitable points, as shown in Fig. 4; but any suitable arrangement for the purpose may be employed. As best shown in Fig. 1, the walls separating these passages 39 from the retort are made comparatively thin to increase the heating effect upon the retort and its contents of the hot waste gases passing through the passages 39. It will be understood that the passages 39 around both retort generators communicate, so that the waste gases from either generator chamber serve to heat both retorts.

43 indicates a hood arranged in the lower portion of the hopper 13 of each retort generator and extending centrally across the same, as illustrated in Figs. 1 and 6,—said hood being a sufficient distance above the ridge-like top of the flue 15 so that gases may flow freely above said top into the space below said hood. At one end of such space there is provided a pipe 44 which connects with an exhauster 45, best shown in Fig. 6, the pipes 44 of both retort-generators being connected with said exhauster by a fitting 46. 47 indicates a valve provided in the pipes 44 for regulating the suction applied through said pipes, and for closing either of said pipes when necessary in the operation of the apparatus. The exhauster 45 connects with a header 48, best shown in Figs. 2 and 6, which extends over the upper end of the flue 19 and connects with a plurality of—preferably three—superheater pipes 49 which extend down through the center of the flue 19, as best shown in Fig. 2, and connect with a header 50 shown in Figs. 2 and 5. The header 50 extends beyond one of the side walls of the apparatus, as shown in Fig. 5, and connects by pipes 51 with pipes 52 which discharge into the space below the grate bars 10 of the two generator chambers, as shown in Fig. 1. The pipes 52 are connected by an intermediate duct 53 which communicates through an opening 54 shown in Fig. 2 with the air duct 23. The pipes 51 are provided with valves 55, and the pipes 52 are provided with valves 56, as shown in Figs. 1 and 5. 57 indicates a pipe leading from the duct 53 to the central combustion chamber 32, as best shown in Figs. 1 and 2. Said pipe is provided with a valve 58 operated by a handle 59. 60 indicates a steam pipe connecting at its upper end with the header 48 and at its lower end, through a pressure regulator 61, with a steam supply pipe 62. The pressure regulator 61 may be any commercial form of device suitable for the purpose of admitting steam to the pipe 60 whenever the pressure therein falls below a predetermined point, and cutting off the steam supply when the pressure has been restored.

63 indicates a series of pressure gages, which are connected by tubes 64 with openings 65 at different levels in the retort, so that the operator, by glancing at the several gages, may note immediately the pressure in different zones of the retort, to guide him in regulating the operation of the apparatus.

The operation of the apparatus is as follows: Assuming that the materials used are sub-bituminous coal, lignite, peat, or some similar material containing large percentages of moisture and combined oxygen, the materials to be treated are placed in the hoppers of the two retort-generators and pass down over the hood 43, and between the sides of the flue 15 and the walls of the retort.

As has been suggested, the two retort-generators are operated cyclically, one of them being operated on blast during the "run" period of the other. When the temperature of the retort-generator on "run" falls below that required for the generation of water gas and the temperature of the retort-generator on blast rises to the proper point for the generation of water gas, which periods are substantially equal, the operation of the retort-generators is reversed; thus the generation of water gas is continuous. During the blast period of either generator heated air is introduced below the grate bars of such generator from flue 23, through duct 53, and the appropriate pipe 52, one of the valves 56 being open and the other closed so as to appropriately direct the incoming air to the proper generator. This air is forced in by means of the blower 29, and, passing up through the grate bars, effects the combustion of the fuel in the generator, which, as has been explained, is distributed throughout the generator by the deflector 14. The fuel thus consumed consists of the residuum of the materials introduced through the hopper after its volatile constituents have been removed by distillation in the retort, as will be hereinafter described. At this time, the gate 33, or 34, as the case may be, controlling communication between the passage 31 of this generator and the combustion chamber 32, is open, while the gate of the other passage 31 is closed. Thus the products of combustion pass out of the generating chamber through passage 31 to the central combustion chamber 32. This chamber 32 receives an auxiliary supply of heated air from the duct 23 through pipe 57, the valve 58 being open to a greater or less extent, depending upon the volume of air desired, so that the combustion of any unconsumed combustible gases is promoted. The hot blast gases then pass through the passages 39, around both retorts, until finally they are discharged into the central flue 19 through openings 40. This flow of very hot waste gases through the passages 39 heats the retorts, the heat being greatest at the bottom and gradually diminishing toward the top as the gases cool. The waste gases then pass down through the central flue 19 around the superheater pipes 49 to the outlet pipe 20, through which they are discharged to the stack 22, either directly or through the by-pass 24, depending on the adjustment of the valves 26—27. The exhauster 25 provides for regulating the flow of the waste gases so as to secure the best results. The flow of the hot waste gases through the flue 19 around the superheater pipes 49 utilizes the heat of such gases to heat the contents of said pipes, and in like manner, the flow of the waste gases through the outlet pipe 20 utilizes their heat to heat the air in the air duct 23, so that a large part of the heat of the waste gases is utilized. By placing the superheater in a flue disposed between two retorts, the heat supplied to said flue is conserved and is more effective in heating the superheater, since such flue is insulated by the walls of the retort.

When a sufficiently high temperature has been attained in the body of fuel within the generator, the air blast is shut off by closing the appropriate valve 56, and the gate 33, or 34, controlling the passage 31 leading from such generator, is shut to prevent the outflow of gases through such passage 31. The appropriate valve 55 which controls the admission of steam and gas from the superheater pipes to such generator chamber is then opened, admitting superheated steam and other gases associated with it, as hereinafter described, to the generator chamber, forming water gas by the decomposition of the steam and the union of the oxygen thereof with the carbon of the fuel ($H_2+CO$). This hot water gas passes up through the material in the retort into the combustible gas flue 15, and thence out through pipe 16, through which it is conducted away for further treatment,—its passage into such flue being promoted by the exhauster connected with the pipe 16, as hereinbefore suggested. During its passage upward through the material in the retort, this hot water gas aids in the carbonization of the coal; in the removal of scurf from the inner walls of the retort; in an equalization of the temperatures in the retort; and in preventing decomposition of the richer hydrocarbon gases and ammonia gas which are in process of being given off by the coal. The materials used, passing down from the hopper between the sides of the flue 15 and the walls of the retort, are subjected to gradually increasing temperatures as they pass downward, the hot combustible gases passing through the flue 15 serving to assist in raising the temperature of the fuel. The object of tapering the sides of the flue 15 is to prevent clogging of the fuel in the retort and insure its free passage down between the flue and the walls of the retort. By thus subjecting the materials to gradually increasing temperatures, the larger part of the moisture and carbon dioxid may be separated from the coal during the initial stages of heating, and this is accomplished in the apparatus illustrated as follows: The valve 47 in pipe 44 being opened, as soon as the fuel reaches a temperature above 212° F., steam is given off and, by the operation of the exhauster 45, is drawn up under hood 43 and out through pipe 44 to the header 48, from which it passes downward through the superheater pipes 49. Carbon dioxid is given off in volume at temperatures of about 400° F., and consequently when that temperature is reached, the carbon dioxid also is drawn out through pipe 44 to the superheater pipes 49. Tar and the combustible gases do not begin to come off in quantity at temperatures below 650° F.; consequently it will be apparent that the moisture, as steam, with a considerable admixture of carbon dioxid, may be distilled off and conducted from the retort to the superheater pipes 49 before the tar and combustible gases are given off. This steam and carbon dioxid are further heated in the superheater and are then introduced, with the steam supplied through pipe 60, into the generator chamber, where the steam is decomposed to form water gas, as hereinbefore described, and a considerable percentage of the carbon dioxid is also reduced to the form of carbon monoxid—one of the constituents of water gas.

The material in the retort, after the removal of the steam and carbon dioxid, is subjected to higher temperatures, by which the volatile gases, tar, etc., are driven off and carried away through the central flue 15 to the combustible gas outlet pipe 16, along with the water gas produced in the generator chamber. The residue of the material passes on downward through the retort as it is consumed from below until finally the ash passes through the grate bars into the ash-pit. It will be understood that the height of the retort, the temperature applied, and the speed of passage will be so controlled that the material will have given off substantially all of its volatile substances, and will have become substantially fixed carbon and ash by the time it reaches the entrance to the generator portion of the apparatus. At this point it meets the deflector 14, which helps to sustain the column of material in the retort and utilizes the force of gravity to fracture the material and distribute it over the greater width of the generator. The deflector also serves to preserve a central zone of less compacted material, through which air and steam may more readily pass.

Preferably, when sub-bituminous coal, lignite, or peat are the materials used, they are air dried before being fed into the hopper, until they do not contain more than thirty per cent. of moisture, which will ordinarily supply sufficient steam to support water gas production in the generator, but a sufficient supply of steam and a uniform pressure are maintained by means of the pressure regulator 61, which automatically controls the admission of a separate supply of steam through pipe 60, as hereinbefore described.

When the material used is a gas coal—i. e. a coal rich in volatiles, but containing only small percentages of moisture and combined oxygen—the valves 47 in pipes 44 are closed and the exhauster 45 put out of operation. The gases given off initially during the "run" period are caused to pass downward through the material in the retort to the lower end of the central flue 15, where they mingle with the gases rising from below and pass upward and out through pipe 16, imparting some of their sensible heat through the walls of the flue to the material in the upper portion of the retort. This flow of the gases liberated is effected by regulating the operation of the exhauster connected with the combustible gas outlet pipe 16 so as to create a low pressure area at or adjacent to the inlet to the flue 15. The exhauster 25 is used to control the discharge of combustible gases through the flue 15 during the blast period, in order to prevent the waste gases from passing up through the material in the retort to the outlet flue 15. The several pressure gages 63 enable the operator to observe the pressure at the different zones in the retort so that he may regulate the operation of the exhausters as may be necessary to maintain the proper flow of the gases in the retort and generator.

As compared with the existing forms of apparatus for the carbonization of coal—particularly what are known as "continuously operated vertical retorts"—there is a distinct advantage gained through using my improved apparatus. Moisture, heavy hydrocarbons which tend to condense, and the low temperature tar, by their downward passage through the more highly heated portion of the retort, are further decomposed; a portion of the water vapor is gasified; a portion of the carbon dioxid is reduced to carbon monoxid; and much of the condensable hydrocarbons are further decomposed into fixed gases, increasing the quantity and, in some degree, the quality of the gas made. Furthermore, the heat produced by a partial decomposition of the residue of distillation is most completely utilized, since it supports the water gas reaction in the generator; it supplies the heat required for the carbonization of the coal; in its downward passage between the two retorts it superheats the steam used in water gas production; and, finally, it imparts a large portion of its remaining heat to the air supply before passing to the stack. It will be noted that each successive use of the hot gases is for a purpose which requires and can be accomplished by a lower temperature than the preceding one, and consequently the efficiency of the operation is not impaired.

The pipes 16 which carry off the combustible gases are provided with dampers 17 for regulating the pull of the exhauster connected with such pipes. Each damper is partially closed during the blast period of the retort-generator with which it is associated, so that the coal gases given off during that period may be conveyed away without drawing off any substantial portion of the blast gases used.

From the foregoing description it will be seen that by the use of my improved apparatus practically all the combustible constituents of the materials used are converted into combustible gas, except such part of the material as is required to supply the heat necessary to the operation. A large portion of the heat heretofore wasted is also utilized, and a considerable degree of economy in the labor expense is also obtained. A further advantage of the use of my improved apparatus is that the gas is produced under substantially uniform conditions, and hence is of uniform composition. It contains a smaller portion of condensable hydrocarbons than is found in the standard coal gas or oil-enriched water gas, and therefore can be transported from the works to the point of consumption under high pressure, or through mains at low temperature, with less deposit of combustibles in the drips, and consequently less loss of heating value as delivered. Furthermore, in mantle lighting and in many cooking and industrial appliances it will burn more clearly and rapidly and will give a greater value in results per B. T. U. than can be obtained from gases of higher calorific value now generally made and distributed.

It will be understood that the apparatus shown and specifically described may be modified in many respects without departing from my invention.

What I claim as my invention, and desire to secure by Letters Patent, is,—

1. A gas apparatus, comprising a plurality of retort-generators, each having a generating chamber and a retort above and communicating with said chamber, passages arranged to subject a plurality of said retorts to the heat of the waste gases from either of the generating chambers, means for cutting off said passages from either of said generating chambers, a flue into the upper end portion of which said passages discharge, a stack connected with the lower portion of said flue, a by-pass connected with the stack and communicating with said flue, and an exhauster for drawing the gases through said by-pass.

2. A gas apparatus, comprising a retort-generator having a generating chamber and a retort above and communicating with said chamber, means for conducting waste gases from the generating chamber upwardly around said retort, a flue into which said gases are discharged, a stack with which said flue communicates, and a superheater in said flue and arranged to discharge into the generating chamber.

3. A gas apparatus, comprising a retort-generator having a generating chamber and a retort above and communicating with said chamber, means for conducting waste gases from the generating chamber upwardly around said retort, a flue into which said gases are discharged, a stack with which said flue communicates, a superheater in said flue and arranged to discharge into the generating chamber, and means for supplying steam to said superheater.

4. A gas apparatus, comprising a retort-generator having a generating chamber and a retort above and communicating with said chamber, means for conducting waste gases from the generating chamber upwardly around said retort, a flue into which said gases are discharged, a stack with which said flue communicates, a superheater in said flue and arranged to discharge into the generating chamber, and means for supplying gases from the retort to said superheater.

5. A gas apparatus, comprising a retort-generator having a generating chamber and a retort above and communicating with said chamber, means for conducting waste gases from the generating chamber upwardly around said retort, a flue into which said gases are discharged, a stack with which said flue communicates, a superheater in said flue and arranged to discharge into the generating chamber, means for supplying gases from the retort to said superheater, and means for supplying steam to said superheater.

6. A gas apparatus, comprising a plurality of retort-generators, each having a generating chamber and a retort above and communicating with said chamber, passages arranged to subject a plurality of said retorts to the heat of the waste gases from either of the generating chambers, means for cutting off said passages from either of said generating chambers, a flue into the upper portion of which said passages discharge, a stack with which the lower end of said flue communicates, one or more superheater conduits in said flue, said superheater conduits communicating with said generating chambers, and means for controlling the flow of gases from said superheater conduits to one or the other of said generating chambers.

7. A gas apparatus, comprising a plurality of retort-generators, each having a generating chamber and a retort above and communicating with said chamber, passages arranged to subject a plurality of said retorts to the heat of the waste gases from either of the generating chambers, means for cutting off said passages from either of said generating chambers, a flue into the upper portion of which said passages discharge, a stack with which the lower end of said flue communicates, one or more superheater conduits in said flue, said superheater conduits communicating with said generating chambers, means for controlling the flow of gases from said superheater conduits to one of the other of said generating chambers, and means connecting the upper portions of said superheater conduits with the retorts.

8. A gas apparatus, comprising a plurality of retort-generators, each having a generating chamber and a retort above and communicating with said chamber, passages arranged to subject a plurality of said retorts to the heat of the waste gases from either of the generating chambers, means for cutting off said passages from either of said generating chambers, a flue into the upper portion of which said passages discharge, a stack with which the lower end of said flue communicates, one or more superheater conduits in said flue, said superheater conduits communicating with said generating chambers, means for controlling the flow of gases from said superheater conduits to one or the other of said generating chambers, means connecting the upper portions of said superheater conduits with the retorts, and means for supplying steam to said superheater conduits.

9. A gas apparatus, comprising a plurality of retort-generators, each having a generating chamber and a retort above and communicating with said chamber, passages arranged to subject a plurality of said retorts to the heat of the waste gases from either of the generating chambers, means for cutting off said passages from either of said generating chambers, a flue into the upper end portion of which said passages discharge, one or more superheater conduits in said flue, means connecting said conduits with the upper portion of the retorts and for causing the gases to flow downward through said conduits, means connecting said conduits with the generating chambers, and means for controlling the flow of gases to one or the other of said generating chambers.

10. A gas apparatus, comprising a plurality of retort-generators, each having a generating chamber and a retort above and communicating with said chamber, passages arranged to subject a plurality of said retorts to the heat of the waste gases from either of the generating chambers, means for cutting off said passages from either of said generating chambers, a flue into the upper end portion of which said passages discharge, one or more superheater conduits in said flue, means connecting said conduits with the upper portion of the retorts and for causing the gases to flow downward through said conduits, means connecting said conduits with the generating chambers, means for controlling the flow of gases to one or the other of said generating chambers, and means for supplying steam to said conduits.

11. A gas apparatus, comprising a plurality of retort-generators, each having a generating chamber and a retort above and communicating with said chamber, passages arranged to subject a plurality of said retorts to the heat of the waste gases from either of the generating chambers, means for cutting off said passages from either of said generating chambers, a flue into the upper portion of which said passages discharge, a stack, a pipe leading from the lower portion of said flue to said stack, an air duct surrounding said pipe, and means for admitting air from said air duct to the generating chambers.

12. A gas apparatus, comprising a plurality of retort-generators, each having a generating chamber and a retort above and communicating with said chamber, passages arranged to subject a plurality of said retorts to the heat of the waste gases from either of the generating chambers, means for cutting off said passages from either of said generating chambers, a flue into the upper portion of which said passages discharge, a stack, a pipe leading from the lower portion of said flue to said stack, an air duct surrounding said pipe, and means for admitting air from said air duct to the generating chambers and to said passages.

13. A gas apparatus, comprising a plurality of retort-generators, each having a generating chamber and a retort above and communicating with said chamber, a central combustion chamber communicating with said generating chambers, means for cutting off said combustion chamber from either of said generating chambers, means for supplying air to said combustion chamber, and means for conducting the gases from said combustion chamber around a plurality of said retorts.

14. A gas apparatus, comprising a generating chamber, a retort above and communicating with said chamber, a plurality of separate gas outlets communicating with said retort at different levels for separating the gases given off at different temperatures, and exhaust mechanism for controlling the outflow of gas through said outlets.

15. A gas apparatus, comprising a generating chamber, a retort above and communicating with said chamber, a plurality of separate gas outlets communicating with said retort at different levels, and means for superheating the gases discharged through one of said outlets and discharging them into the generating chamber.

16. A gas apparatus, comprising a plurality of retort-generators, each having a generating chamber and a retort above and communicating with said chamber, and means for removing from said retorts the gases given off at a low temperature separately from those given off at a higher temperature, and for conducting the gases given off during the initial heating into either of said generating chambers.

17. A gas apparatus, comprising a water-gas generating chamber, an externally-heated retort above and discharging into said generating chamber, a flue centrally placed within the retort and opening intermediately thereinto, a duct connected with said flue, and means for controlling the flow of gas from the retort into said flue.

18. A gas apparatus, comprising a water-gas generating chamber, an externally-heated retort above and discharging into said generating chamber, a flue centrally placed within the retort and opening intermediately thereinto, a duct connected with said flue, a separate gas outlet opening into the upper portion of the retort, and means for controlling the outflow of gas through either the latter outlet or said flue.

19. A gas apparatus, comprising a retort-generator having a generating chamber and a retort above and communicating with said chamber, means for conducting blast gases from the generating chamber upwardly around said retort, a flue into which said gases are discharged, a superheater in said flue and arranged to discharge into the generating chamber, a plurality of separate gas outlets communicating with said retort at different levels, and a duct leading from one of said outlets to said superheater.

20. A gas apparatus, comprising a plurality of retort generators, each consisting of a water-gas generating chamber and a retort above and discharging by gravity directly into said chamber, passages arranged to subject a plurality of said retorts to the heat of the blast gases from either of the generating chambers, and separate outlets from said retorts for separately removing therefrom gases liberated therein at different temperatures.

21. A gas apparatus, comprising a plurality of retort-generators, each consisting of a water-gas generating chamber and a retort above and discharging by gravity directly into said chamber, passages arranged to subject a plurality of said retorts to the blast gases from either of the generating chambers, means for cutting off either of said generating chambers from said passages, a superheater subjected to the heat of the blast gases issuing from the passages around said retorts, and a plurality of separate outlets from each of said retorts, one of the outlets from each retort being connected with said superheater.

22. A gas apparatus, comprising a retort generator having a generating chamber and a retort above and communicating with said chamber, a plurality of outlets from said retort at different levels, means for controlling the discharge of gases through said outlets, and gages operatively connected with different zones of the retort for indicating the pressure therein in such zones.

23. The combination with a plurality of retort-generator units, each comprising a water-gas generating chamber and a retort above and discharging directly into said chamber, of means for alternately utilizing the blast gases from the generator of each unit to heat the retorts of a plurality of said units, and means for superheating and alternately introducing into the generating chamber of the several units during the run period thereof the gases given off initially in said units, respectively.

24. The combination with a plurality of retort generator units, each comprising a water-gas generating chamber and a retort above and discharging directly into said chamber, of means for alternately utilizing the blast gases from the generator of each unit to heat the retorts of a plurality of said units, means for superheating and alternately introducing into the generating chamber of the several units during the run period thereof the gases given off initially in said units, respectively, and means for separately withdrawing from the several units the high temperature volatile substances liberated therein.

25. The combination with a plurality of retort generator units, each comprising a water-gas generating chamber, a retort above and discharging by gravity directly into said chamber, and means for maintaining continuously a supply of fuel in said retorts, of conduits opening into the retorts intermediately of the mass of fuel therein, and external means for heating the retorts of a plurality of said units by the blast gases from the generating chamber of either unit.

26. The combination with a retort-generator, comprising a water-gas generating chamber, and a retort above and discharging by gravity directly into said chamber, of means for withdrawing from the retort the gases given off initially therein, superheating them, and then introducing them into the generating chamber.

27. The combination with a plurality of retort-generators, each comprising a generating chamber and a retort above and communicating with such generating chamber, of a flue disposed between said retort-generators, superheating means in said flue connected with said retorts and with said generating chambers, and means for conducting blast gases from said retort-generators through said flue.

WILLIAM D. WILCOX.